Dec. 6, 1938.   N. R. POST ET AL   2,138,820
EARTH SCRAPER
Filed March 23, 1937   3 Sheets-Sheet 1

Inventors
Norman R. Post
Charles R. Post
By Lyon & Lyon  attys

Inventors
Norman R. Post
Charles R. Post

By Lyon & Lyon
attys

Dec. 6, 1938.  N. R. POST ET AL  2,138,820
EARTH SCRAPER
Filed March 23, 1937   3 Sheets-Sheet 3
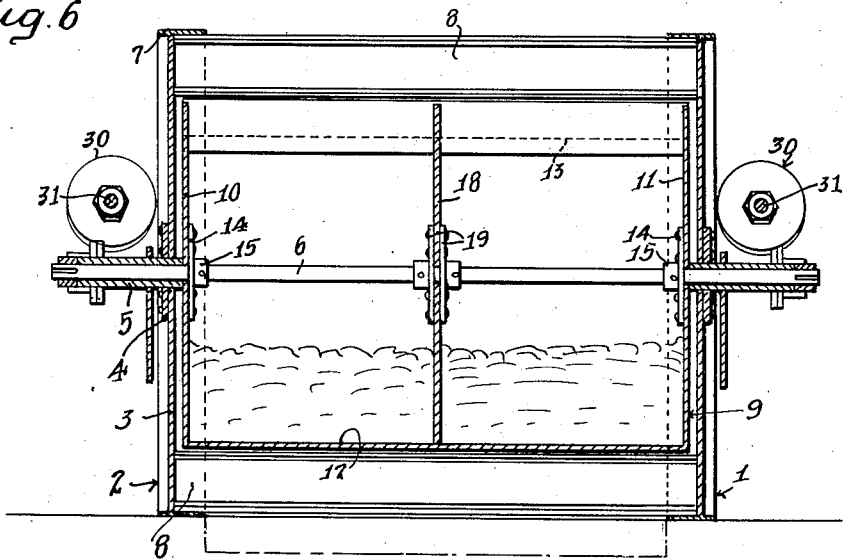
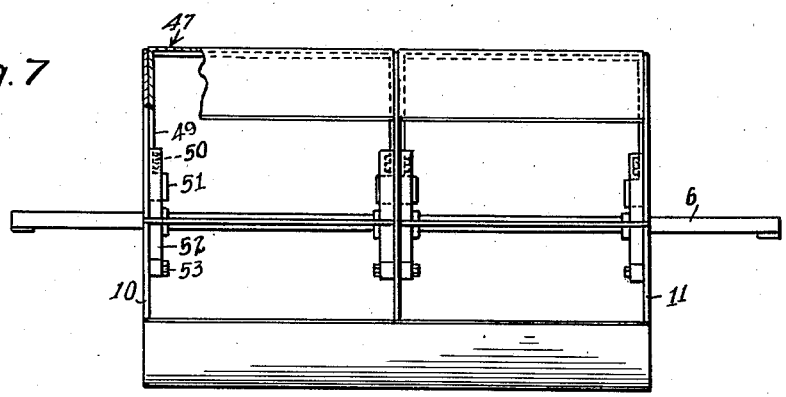
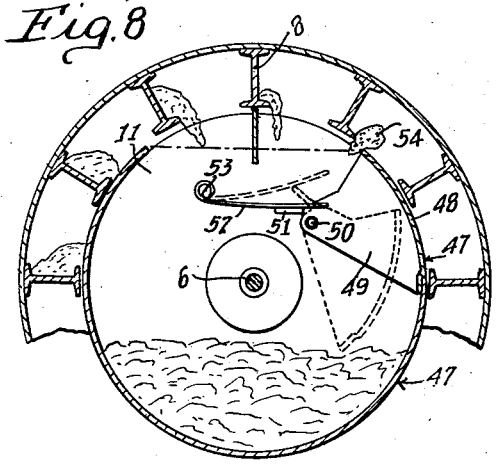
Inventors
Norman R. Post
Charles R. Post
By Lyon & Lyon
attys.

Patented Dec. 6, 1938

2,138,820

UNITED STATES PATENT OFFICE 2,138,820

EARTH SCRAPER

Norman R. Post and Charles R. Post, Santa Ana, Calif., assignors to American Tractor Equipment Corp., a corporation of California Application March 23, 1937, Serial No. 132,523

10 Claims. (Cl. 37—9)

Our invention relates to earth scrapers and has particular reference to a scraper adapted to scrape a layer of earth from the ground over which it is drawn and in which the dirt or earth removed by the scraper will be deposited in a carrier attached to the scraper and by which the dirt may be transported to any desired location.

Earth or dirt scrapers as commonly employed comprise a relatively flat scoop having draft appliances attached thereto by which the scraper may be drawn over the ground by horses, tractors or other motive power. The scraper, being in the form of a scoop, is adaptable not only as a cutter to remove the earth but also as a retainer for the earth and by which the earth may be transported. The scraper, however, may be dumped by man power applied to handles or other lifting apparatus at the rear of the scoop and when it is desired to transport the earth any appreciable distance the operator usually presses down upon the handles to lift the front or cutting edge of the scraper out of contact with the ground over which it is drawn. This occasions considerable wear on the scoop and renders its life relatively short.

It is therefore an object of our invention to provide an earth scraper in which the scraper blade is a separate element from the carrier in which the dirt is deposited and which scraper blade is adapted to be raised and lowered by power means depending upon whether the scraper is to cut the earth or to transport it.

Another object of our invention is to provide a scraper of the character set forth wherein a pair of transport wheels are provided on either end of the scraper and to which the draft appliances may be connected, a plurality of bars extending between and attached to the opposed wheels acting as elevating means lifting the earth up after it has been scraped by a scraper blade attached to the machine and in which the scraper blade is so mounted upon the wheels as to permit its movement between a position in which it cuts the earth as the wheels are drawn thereover and a second position wherein the scraper blade is elevated while the machine is used as a transporting means.

Another object of our invention is to provide a scraper of the character set forth in the preceding paragraph wherein the space defined by the wheels and their interconnected bars accommodates a hopper to receive the earth elevated by the bars and which hopper is adapted to be moved from one position in which its entrance opening is uppermost to a second position in which its entrance opening is directed downwardly to empty the hopper at the desired point.

Another object of our invention is to provide a machine of the character set forth in the preceding paragraph wherein the hopper is provided with a movable gate adapted to move relative to the remainder of the hopper to avoid inadvertent dumping of the hopper should stones or large portions of earth become caught between the elevating bars and the hopper and to prevent damage to the hopper in such event.

Another object of our invention is to provide an earth scraper of the character set forth wherein means is provided for elevating the scraper blade and in which mechanism interconnects the scraper blade and the hopper whereby a single operating element is enabled to control the scraper blade elevation and the hopper position.

Other objects of our invention will be apparent from a study of the following specification read in connection with the accompanying drawings, wherein—

Fig. 6 is a vertical sectional view taken along line VI—VI of Fig. 5;

Fig. 7 is a plan view of a modified form of hopper which may be used with our scraping machine; and Fig. 8 is a detail vertical sectional view of a scraper constructed in accordance with our invention and employing the modified form of hopper shown in Fig. 7.

Figure 1:
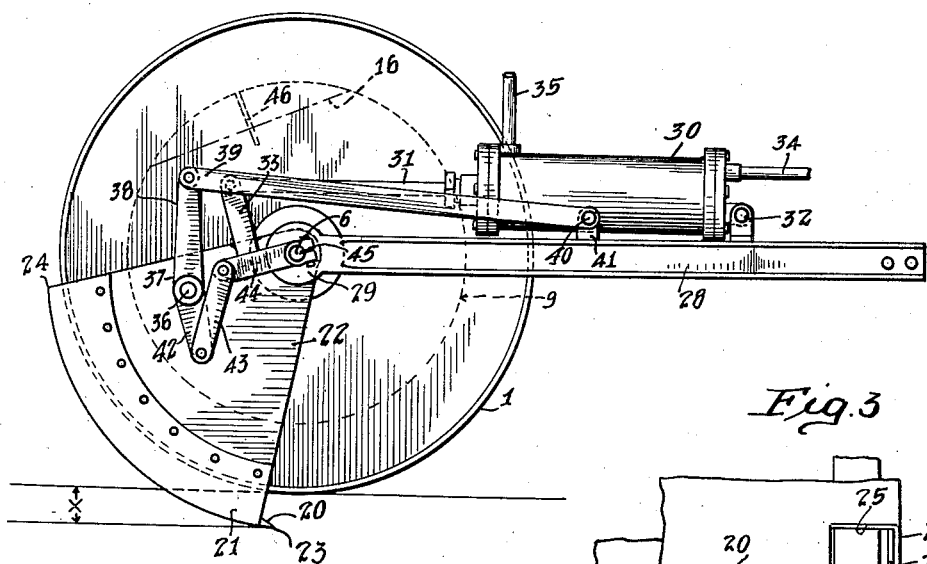
Fig. 1 is an elevational view of an earth scraper constructed in accordance with our invention and illustrating the scraper blade in scraping position.

Referring to the drawings, we have illustrated an earth scraper comprising a pair of transport wheels 1 and 2, each of which is constructed (see Fig. 6 of a disc-like member 3, to the center of which is attached a bearing plate 4 adapted to be rotatably mounted upon a bearing sleeve 5 which in turn surrounds an axle 6 extending across the machine. The outer periphery of the disc-like member 3 is provided with a cylindrical flange 7 constituting a tread portion of the wheel and preferably of such width as to maintain traction upon relatively soft earth over which the machine will be drawn.

The two wheels 1 and 2 are spaced apart and rigidly connected together by means of a plurality of cross bars 8 which may take any desired form though we prefer to construct the same of suitable lengths of structural I beams, the characteristics of which are particularly adapted to the purpose of elevating the earth scraped by the machine, as will be more fully hereinafter pointed out. The cross bars or I beams 8 are preferably evenly distributed about the periphery of the wheels and may be attached both at their ends to the disc member 3 of the wheels and at their outermost webs to the flange 7 of the wheels to insure a rigid construction of the wheel and cross bar members. The depth of the cross bars is preferably relatively small so that the assembled bars define a substantially cylindrical interior space concentric with the wheels 1 and 2 within which may be located a dirt-carrying hopper 9. This hopper may be of any suitable construction though we prefer that the same shall be formed of a pair of end disc-like members 10 and 11 interconnected by a substantially cylindrical outer covering or sheet of material 12 which may be welded, bolted or otherwise secured to the end discs 10 and 11. As is illustrated particularly in Fig. 6, the covering sheet 12 does not extend completely around the periphery of the discs 10 and 11 but terminates short thereof, as indicated at 13, thereby providing an open space through which earth may fall into the hopper and through which earth may be dumped from the hopper when desired.

The hopper 9 is rigidly supported upon the axle 6 as by providing flange members 14 on each of the discs rigidly connected as at 15 to the axle 6 so that by rotating the axle the hopper may be turned from its normal upright position (as indicated by the dot-dash line 16, Fig. 1) wherein the opening of the hopper is uppermost to an inverted position (indicated by the dot-dash line 17, Fig. 2) wherein the opening of the hopper is directed downwardly. If desired, a central bracing member may be provided, illustrated herein as a disc 18 (similar to discs 10 and 11) located approximately centrally of the hopper 9 and connected by flange members 19 to the axle 6 in the same manner as described with reference to discs 10 and 11.

Figure 3:
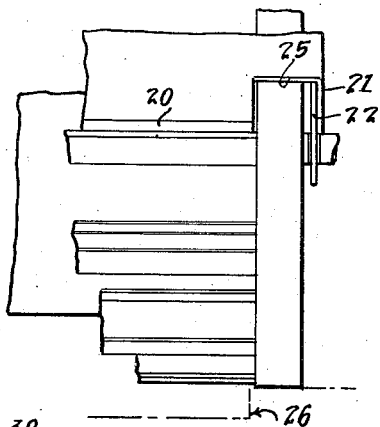
Fig. 3 is a fragmentary view of one end of the hopper shown in Fig. 2, looking in the direction of the arrow III of Fig. 2.
Figure 4:
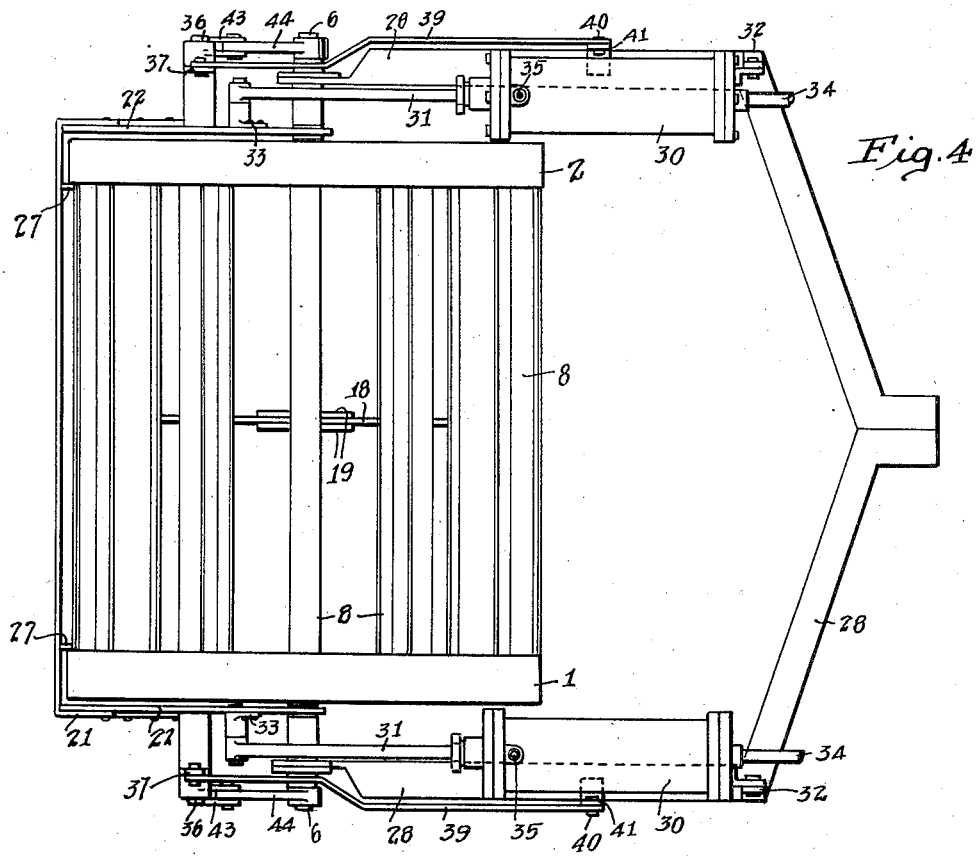
Fig. 4 is a top plan view of the scraper illustrated in Figs. 1 to 3.

It will be noted from an inspection of Figs. 3 and 4 that the cross bars 8 with the wheels 9 and 2 constitutes a cage-like construction which may be rolled over the ground to be scraped and which will cooperate with a scraper blade 20 to elevate earth cut by the scraper blade to a position emptying the earth into the mouth of the hopper 9.

By referring to Figs. 1, 3, 5 and 6, it will be noted that the scraper blade 20 constitutes a segment of a cylinder, the end edges of which are turned inwardly as indicated at 21 where they are attached to a segmental support 22, one for each end of the scraper blade 20. The segmental supports 22 at opposite sides of the machine are rigidly secured to the bearing sleeves 5 so as to have rotation relative to the axle 6 and also to the wheels 1 and 2.

As is illustrated particularly in Fig. 3, the lowermost portion of the scraper blade 20 adjacent the wheels 1 and 2 is cut out as indicated at 25, so as to prevent compression of the earth by the wheels upon the cutting edge 23 of the scraper blade and thus avoid cutting of the earth immediately below the traction point of the wheels, the cut made having the formation indicated at 26 in Fig. 3. It will also be noted that in order to prevent compacting of the earth between the flanges 7 of the wheels and the scraper blade, it may be preferable to provide side plates 27 on the scraper blade 20 disposed as baffles just inside the inner edge of the flanges 7 of the wheels, thus leaving the wheels free to rotate without interference by the earth which has been scraped up.

Figure 2:
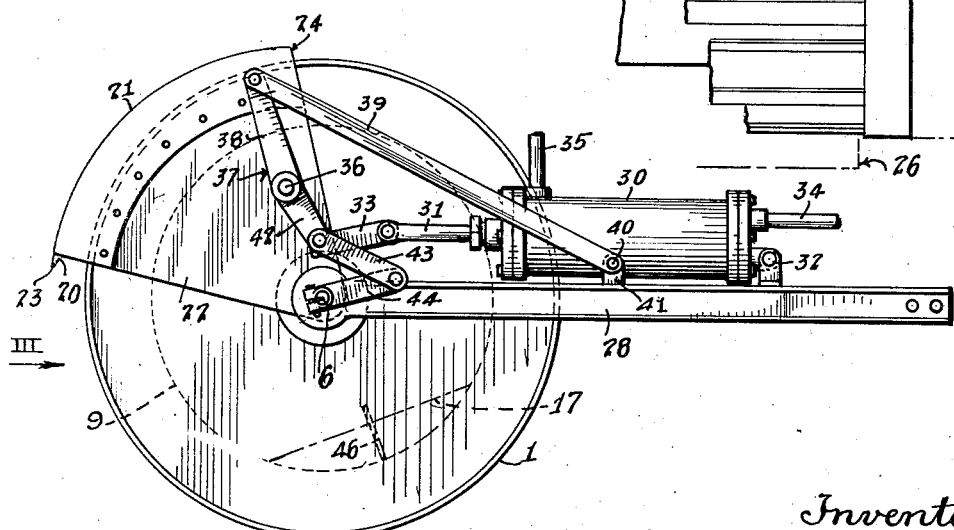
Fig. 2 is a view similar to Fig. 1 but illustrating the hopper in its dumped position.

It will be noted from Figs. 1 and 2 that the segmental supports 22 have their side edges constructed of two different lengths so that when the scraper blade 20 is secured to the machine the cutting edge 23 of the scraper blade 20 is disposed at a greater distance from the axle 6 than the trailing edge 24 of the scraper blade 20 so that the space defined between the scraper blade 20 and the circumference of the cage-like construction formed by the wheels 7 and cross bars 8 constitutes a passage for earth which diminishes in depth as the earth is drawn rearwardly into the scraper blade 20.

With the scraper blade, wheels, bars and hopper arranged as hereinbefore described, it will be apparent that by connecting a draft coupling 28 to the opposite ends of the axle 6, as by forming eyes 29 in the ends of the draft coupling which ride upon and through which projects the outer ends of the sleeves 5, the forward movement of the scraping machine, by drawing on the draft coupling 28, will cause the wheels to ride upon the earth surface while the scraper blade 20 will be disposed below the earth surface and will scrape earth therefrom to a suitable depth as indicated at X in Fig. 1.

The earth so cut will pass rearwardly in the scraper blade 20 and will be picked up by the cross bars 8 and the cross bars will act as elevators, lifting the earth upwardly out of the scraper blade and transporting it to the open mouth of the hopper 9 (which in our assumed operation is disposed uppermost in the machine). The earth so scraped or caught will be deposited in the hopper until the hopper is full, at which time the scraper blade 20 may be elevated out of contacting position with the ground, as shown in Fig. 5, and the entire machine then becomes a transport vehicle by which the previously scraped earth may be transported to a suitable location for dumping.

The lifting and lowering of the scraper blade may be accomplished in any suitable manner though we prefer that suitable power devices be provided for lifting and lowering the scraper blade, such as an hydraulic cylinder 30 mounted upon the draft coupling 28 as by a hinged mounting 32. The hydraulic cylinder 30 is provided with a piston (not shown), the rod 31 of which extends rearwardly above the axle 6 and is connected to a lug 33 rigidly secured to the segmental support 22 for the scraper blade. Thus by applying hydraulic power to the cylinder 30 on the forward side of the piston as through pipe 34, the piston will be moved rearwardly and, through its connection to the scraper blade, will hold the scraper blade in scraping position, as indicated in Fig. 1. The hydraulic force is preferably applied from the tractor or other draft appliance used to drag the scraper and may comprise any of the fluid power mechanisms such as a liquid pump or similar device located upon the tractor.

Now when it is desired to elevate the scraper blade 20, a portion of the liquid at the forward side of the piston may be removed through pipe 34 and liquid may be supplied at the rear of the piston through the pipe 35 which will move the piston forwardly and, by reason of its connections to the support 22 for the scraper blade, the scraper blade may be elevated to any desired position. By employing the hydraulic cylinder and piston the depth of the cut may be suitably regulated.

Figure 5:
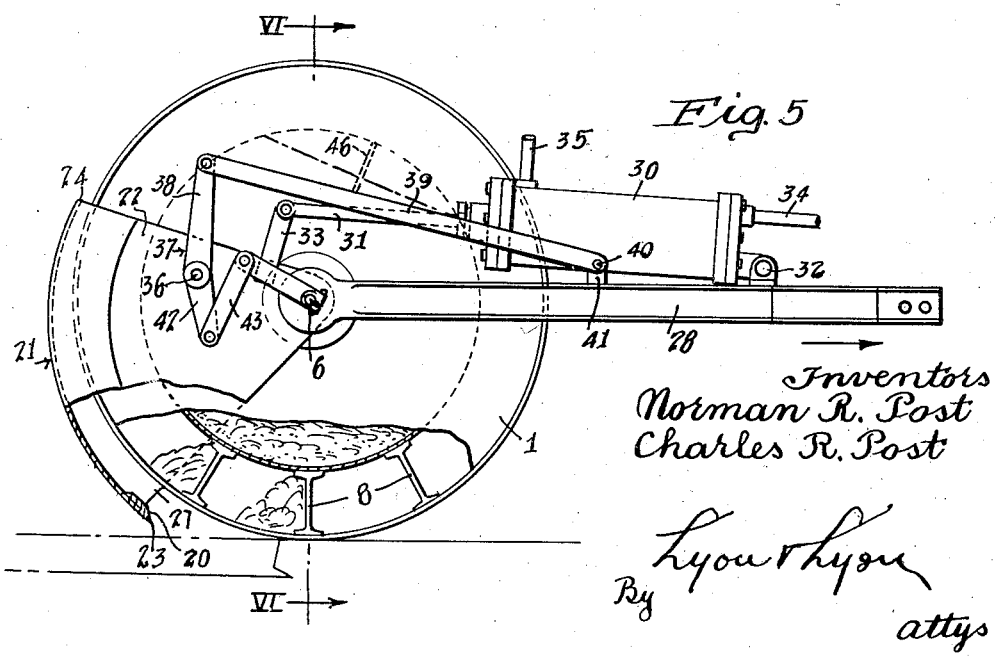
Fig. 5 is an elevational view similar to Fig. 1 and illustrating the scraper blade in its partially elevated position and the hopper in its transport position.

Assuming that the hopper has been filled and it is desired to transport the earth to a suitable dumping location, the scraper blade may be elevated to the position shown in Fig. 5 and held in this position while the draft appliance draws the machine to the dumping location.

The same power mechanism may also be employed for inverting the hopper 9 and we have illustrated herein the manner in which this hydraulic mechanism may be coupled to the hopper for this purpose. By referring particularly to Figs. 1, 2 and 4, it will be noted that the segmental support 22 is provided with an outwardly extending pin 36 upon which is mounted a lever 37, the uppermost end 38 of which is coupled to a link 39, the opposite end of which link is pivotally secured as at 40 to a lug 41 secured to the draft coupling 28. The lower end 42 of the lever 37 is coupled by means of a link 43 to a crank arm 44 rigidly keyed as at 45 to the axle 6.

It will therefore be apparent that each time the piston rod 31 is drawn forward (to the right as shown in Figs. 1 and 2) the upward lift of the scraper blade 20 will be accompanied by a rotary movement of the lever 37 about the pin 36, the link 39 preventing forward movement of the upper end of the lever 38, and hence a lifting force will be exerted through the link 43 upon the crank arm 44. This lifting motion will be transmitted to the axle 6 as a rotary motion in a clockwise direction, as viewed in Figs. 1 and 2, and will cause the hopper 9 to be rotated. When the scraper blade 20 is to be lifted only for the purpose of transporting the dirt, the degree of movement of the scraper blade 20 and its supporting segments 22 will be such that the movement of the hopper will be relatively slight and hence the mouth of the hopper will be retained uppermost to prevent dumping of the contents. However, when the machine arrives in the desired dumping location, the cylinder 30 may be supplied with liquid through the pipe 35 in such amounts as will cause the piston to move to it extreme forward position (the fluid on the forward side of the piston exhausting through pipe 34) and the scraper blade 20 will be lifted to the position shown in Fig. 2, at which time it will be observed that the links and levers interconnecting the scraper blade 20 with the hopper are so disposed that the hopper has been rotated through approximately 180° and now presents its mouth in its lowermost position, as indicated at 17, and the contents of the hopper will be dumped.

While it may be sufficient to provide a power cylinder 30 at one side only of the machine, we prefer to provide a second cylinder at the opposite side of the machine and to connect this cylinder with the segment 22 on that side of the machine by means of links and levers identical with those hereinbefore described. Such cylinder is illustrated in Fig. 4 and corresponding reference numerals indicating duplicate parts have been applied thereto.

It may be found desirable when the scraper blade 20 is in its scraping position to dispose the mouth of the hopper (indicated at 16 in Fig. 1) at a slight angle rearwardly of a true uppermost position so that as the scraper blade 20 is slightly elevated to the transport position as shown in Fig. 5 the amount of movement given the hopper will still retain the mouth of the hopper in an upper position. Also it may be desirable to provide a baffle plate 46 disposed above the mouth of the hopper and extending between the discs 10, 11 and 18 so that earth as it is elevated by the bars 8 will be distributed evenly in the hopper 9.

While the hopper 9 may be constructed exactly as described herein, it may be found desirable to provide a yielding section on the hopper to avoid undue strains on the hopper should stones or lumps of hard earth become caught between the edges of the mouth of the hopper and the elevating bars 8. As shown in Figs. 7 and 8, the front portion of the hopper 9 may be provided with a movable segment 47 comprising a segmental cylindrical plate 48 secured to segmental supports 49 pivoted as at 50 to the discs 10 and 11 of the hopper, the supports 49 being provided with rearwardly extending tail pieces 51 which are adapted to be engaged by springs 52 secured as at 53 to the discs 10 and 11 and adapted to hold the movable segment 47 in its uppermost position as shown in Fig. 8 but which will allow this movable segment 47 to swing downwardly should a stone 54 be caught between one of the bars 8 and the upper edge of the segment 47. This yielding of the segmental section 47 will allow the same to swing inwardly and dislodge the stone or clod of earth 54, preventing damage to the machine.

It will therefore be observed that we have provided an earth scraping machine which may be readily manipulated to act as a scraper and as a transport device for earth scraped thereby and in which the manipulation of the scraper blade and the dumping of the hopper may be controlled from the tractor or other draft appliance to which the machine is connected, thereby avoiding laborious manual labor and allowing the operator of the tractor or draft appliance to also control the scraper.

While we have shown and described the preferred embodiment of our invention, we do not desire to be limited to any of the details of construction shown or described herein, except as defined in the appended claims.

We claim:

1. In an earth scraper, a pair of wheel members, an axle defining the axis of rotation of said wheel members, elevator bars extending between and disposed near the periphery of said wheel members, a scraper blade pivoted upon said axle and disposed rearwardly of said bars, said scraper blade presenting a segmental cylindrical surface to the path of travel of said elevator bars whereby rolling movement of said wheel and bar members will cause earth scraped by said blade to be elevated above said blade, a hopper secured to said axle to receive said elevated earth in one position, power means coupled with said scraper blade for moving said scraper blade between a position disposed below the earth surface contacted by said wheels and another position disposing the scraper blade above said earth surface, and means connecting said power means to said axle to move said hopper between an earth receiving position when said blade is in position below the earth surface and an unloading position when said blade is above the earth surface.

2. In an earth scraper, a pair of wheel members, an axle defining the axis of rotation of said wheel members, elevator bars extending between and disposed near the periphery of said wheel members, a scraper blade pivoted upon said axle and disposed rearwardly of said bars, said scraper blade presenting a segmental cylindrical surface to the path of travel of said elevator bars whereby rolling movement of said wheel and bar members will cause earth scraped by said blade to be elevated above said blade, a hopper disposed within said wheel and bar structure to receive earth elevated by said wheel and bar structure, power means connected with said scraper blade for moving said scraper blade between a position disposed below the earth surface contacted by said wheels and another position disposing the scraper blade above said earth surface, and means interconnecting said scraper blade and said hopper for rotating said hopper about said axis upon movement of said scraper blade by said power means from a loading position wherein earth scraped by said blade is deposited in said hopper to a dumping position when said blade is above the earth surface.

3. In an earth scraper including a pair of wheel members interconnected by elevator bars adapted to be drawn over the ground, the combination of a scraper blade pivoted to said wheel members for movement between a position disposing the cutting edges of the blade below the ground surface and another position disposing the cutting edge above the ground surface, a hopper disposed within said wheel and bar structure to receive earth elevated by said elevator bars, means mounting said hopper for rotary movement from an upright position adapted to receive earth from the elevator bars to a substantially inverted position for dumping earth therefrom, means on said scraper for holding said scraper blade in said first position and for moving said scraper blade to said second position, and means interconnecting said moving means with said hopper to cause movement of said hopper toward said inverted position when said scraper blade is elevated.

4. In an earth scraper including a pair of wheel members interconnected by elevator bars adapted to be drawn over the ground, the combination of a scraper blade pivoted to said wheel members for movement between three positions, one in which the cutting edge of the blade is disposed below the ground surface, a second position in which the blade is disposed slightly above the ground surface and a third position in which the scraper blade is disposed a considerable distance above the ground surface, a hopper disposed within the wheel and elevator bar structure, means mounting said hopper on said wheel structure for movement between an upright position adapting it to receive earth from said elevator bars and an inverted position adapting earth to be dumped from said hopper, means on said scraper connected with said scraper blade for holding said scraper blade in its first named position and for moving the scraper blade to either of its other positions, means interconnecting the scraper blade with said hopper whereby elevation of said scraper blade to said second position will move said hopper partially toward its inverted position whereby the wheel members will act as a transport vehicle carrying earth in the hopper to a dumping location, and whereby movement of said scraper blade to its uppermost position will invert said hopper.

5. In an earth scraper including a pair of wheel members interconnected by elevator bars adapted to be drawn over the ground, the combination of a scraper blade pivoted to said wheel members for movement between three positions, one in which the cutting edge of the blade is disposed below the ground surface, a second position in which the blade is disposed slightly above the ground surface and a third position in which the scraper blade is disposed a considerable distance above the ground surface, a hopper disposed within the wheel and elevator bar structure, means mounting said hopper on said wheel structure for movement between an upright position adapting it to receive earth from said elevator bars and an inverted position adapting earth to be dumped from said hopper, means on said scraper connected with said scraper blade for holding said scraper blade in its first named position and for moving the scraper blade to either of its other positions, a lever on said scraper blade, links interconnecting said lever and said hopper for moving said hopper as said scraper blade is elevated to its second position to move said hopper partially toward its inverted position whereby said wheel members act as a transport means carrying earth in the hopper to a dumping location, and movement of said scraper blade to its uppermost position will cause said hopper to move to its inverted position to dump the contents.

6. In an earth scraper, an axle, a pair of wheels mounted on said axle for rotation, elevator bars extending between and disposed near the periphery of said wheels, a scraper blade on said axle and disposed rearwardly of said bars, a hopper secured to said axle and positioned between said wheels to receive earth cut by the scraper, linkage connecting said blade to said axle whereby rotation of said blade rotates said axle, and power means for moving said blade whereby movement of said blade controls movement of said hopper between a loading and an unloading position.

7. In an earth scraper, a draft frame, a pair of wheels rotatably mounted in said frame, elevator bars extending between and disposed near the periphery of said wheels, a scraper blade pivoted with respect to said frame to cut and supply earth for elevation by said bars, a hopper disposed between and rotatable with respect to said wheels from a first position in which said hopper receives earth from said bars and a second position in which said hopper unloads, means interconnecting said scraper blade and said hopper whereby upon rotation of said blade said hopper is moved through a greater arc of rotation than is said blade, and a common operating means for said blade and said hopper.

8. In an earth scraper, a draft frame, a pair of wheels rotatably mounted in said frame, elevator bars extending between and disposed near the periphery of said wheels, a scraper blade pivoted with respect to said frame to cut and supply earth for elevation by said bars, a hopper disposed between and rotatable with respect to said wheels from a first position in which said hopper receives earth from said bars and a second position in which said hopper unloads, means interconnecting said scraper blade and said hopper whereby rotation of said blade is effective to rotate said hopper, power means for operating said interconnecting means to rotate said blade and hopper simultaneously, and a common operating means for said blade and said hopper.

9. In a device of the character described, a scoop, a hopper, means supporting said scoop and said hopper pivotally on a common axis, linkage interconnecting said scoop and said hopper to move one upon movement of the other and to move one of them through a greater arc of rotation than the other, and means for operating said linkage.

10. In a device of the character described, a scoop, a hopper, means supporting said scoop and said hopper pivotally on a common axis, linkage interconnecting said scoop and said hopper to move one upon movement of the other and to move said hopper through a greater arc of rotation than said scoop upon rotational movement of said scoop, and means for operating said linkage.

NORMAN R. POST.
CHARLES R. POST.